United States Patent [19]
Lee

[11] Patent Number: 6,125,289
[45] Date of Patent: Sep. 26, 2000

[54] PORTABLE TERMINAL HAVING DUAL OPPOSING FLIP COVERS

[75] Inventor: Jae-Gab Lee, Kyongsangbuk-do, Rep. of Korea

[73] Assignee: Samsung Electronics Co., Ltd., Rep. of Korea

[21] Appl. No.: 09/088,888

[22] Filed: Jun. 2, 1998

[30] Foreign Application Priority Data

Jun. 2, 1997 [KR] Rep. of Korea ................. 97-22671

[51] Int. Cl.[7] ................................................. H04Q 7/32
[52] U.S. Cl. ........................ 455/575; 455/90; 455/128; 455/351
[58] Field of Search ............................ 455/575, 566, 455/550, 90, 128, 347, 348, 349, 350, 351; 379/433

[56] References Cited

U.S. PATENT DOCUMENTS 5,440,629 8/1995 Gray ........................................ 379/433
5,907,615 5/1999 Kaschke ................................... 379/433

FOREIGN PATENT DOCUMENTS

| | | |
|---|---|---|
| 2295744 | 6/1996 | United Kingdom . |
| 2322504 | 8/1998 | United Kingdom . |
| 9413088 | 6/1994 | WIPO . |
| 9616504 | 5/1996 | WIPO . |

*Primary Examiner*—Fan Tsang
*Assistant Examiner*—Philip J. Sobutka
*Attorney, Agent, or Firm*—Dilworth & Barrese

[57] ABSTRACT

A portable terminal having dual opposing flip covers. The portable terminal includes a body having a plurality of function keys, and an LCD window, a first flip cover folding device in a lower portion of the body, a first flip cover connected to the first flip cover folding device, a microphone positioned in the first flip cover to be connected to the body, a second flip cover folding device in an upper portion of the body, a second flip cover connected to the second flip cover folding device, and a speaker positioned in the second flip cover to be connected to the body.

9 Claims, 7 Drawing Sheets

PORTABLE TERMINAL HAVING DUAL OPPOSING FLIP COVERS

BACKGROUND OF THE INVENTION

1. Field of the Invention

The present invention relates to a flip-type portable terminal, and in particular, to a 100 mm-or-smaller portable terminal having dual opposing flip covers.

2. Description of the Related Art

Generally, a portable terminal refers to a portable device such as a hands-free telephone, CT-2, a cordless telephone, and a car phone. For implementing communication functions, a portable mobile terminal makes a radio communication with a base station. Likewise, the cordless telephone makes a radio communication with a fixed device.

The portable terminal has been developed following the current trend of highly sensitive and miniaturized electronic parts. Due to its high acoustic sensitivity, a flip-type portable terminal has a popularity over a bar-type one. That is, the flip-type advantageously is provided with a flip cover and a body, which is configured such that the flip cover prevents malfunction of a plurality of function buttons by protecting them and acts as a voice reflecting board during a call.

As shown in FIGS. 1, 2, and 3, a conventional flip-type portable terminal includes a flip cover 200, a body 100, and a flip cover folding device (not shown) for connecting the flip cover 200 and the body 100, and is designed to automatically transit to a speaking mode with the flip cover 200 opened at a speech enabling angle. An antenna 600 is positioned on an upper end of the body 100. A speaker 500 is positioned below the antenna 600, and an LCD (i.e., Liquid Crystal Display) window 150 is positioned under the speaker 500. A plurality of function keys are arranged under the LCD window 150. A bar-type portable terminal has a microphone in a lower end portion thereof, while the flip-type version has a microphone 300 in the flip cover 200 to keep a speech enabling distance between the speaker 500 and the microphone 300.

The requirement of spacing an earpiece from a mouthpiece by a predetermined distance places limits on miniaturization of portable terminals. The distance between a transmitter and a receiver in a portable terminal should be 14 cm or larger. To simultaneously satisfy such a distance requirement and the demand for smaller size, a microphone is typically provided in a flip cover of the current portable terminals.

However, although the above flip-type portable terminals may satisfy the demand for a smaller size, they may malfunction because the flip cover confined in the lower portion thereof makes it difficult to space the transmitter from the receiver by a sufficient distance. Another drawback is that the LCD is too small to display a sufficient number of characters. As a result, the conventional flip-type portable terminals cannot reliably provide communications service. In addition, an LCD window, exposed outside, is vulnerable to shock and scratches, thereby marring the appearance of the terminal.

SUMMARY OF THE INVENTION

To circumvent the above problems, an object of the present invention is to provide a portable terminal having dual opposing flip covers which are configured to overcome the limitations of miniaturized portable terminals.

Another object of the present invention is to provide a portable terminal having dual opposing flip covers which can protect an LCD and an LCD window from surroundings.

Still another object of the present invention is to provide a portable terminal having dual opposing flip covers which enhance the appearance thereof in terms of design.

A further object of the present invention is to provide a portable terminal having dual opposing flip covers which allows an LCD to be larger.

To achieve the above objects, there is provided a portable terminal having dual opposing flip covers. The portable terminal includes a body having a plurality of function keys, and an LCD window, a first flip cover folding device in a lower portion of the body, a first flip cover connected to the first flip cover folding device, a microphone positioned in the first flip cover connected to the body, a second flip cover folding device in an upper portion of the body, a second flip cover connected to the second flip cover folding device, and a speaker positioned in the second flip cover connected to the body.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF PREFERRED EMBODIMENTS

Figure 1:
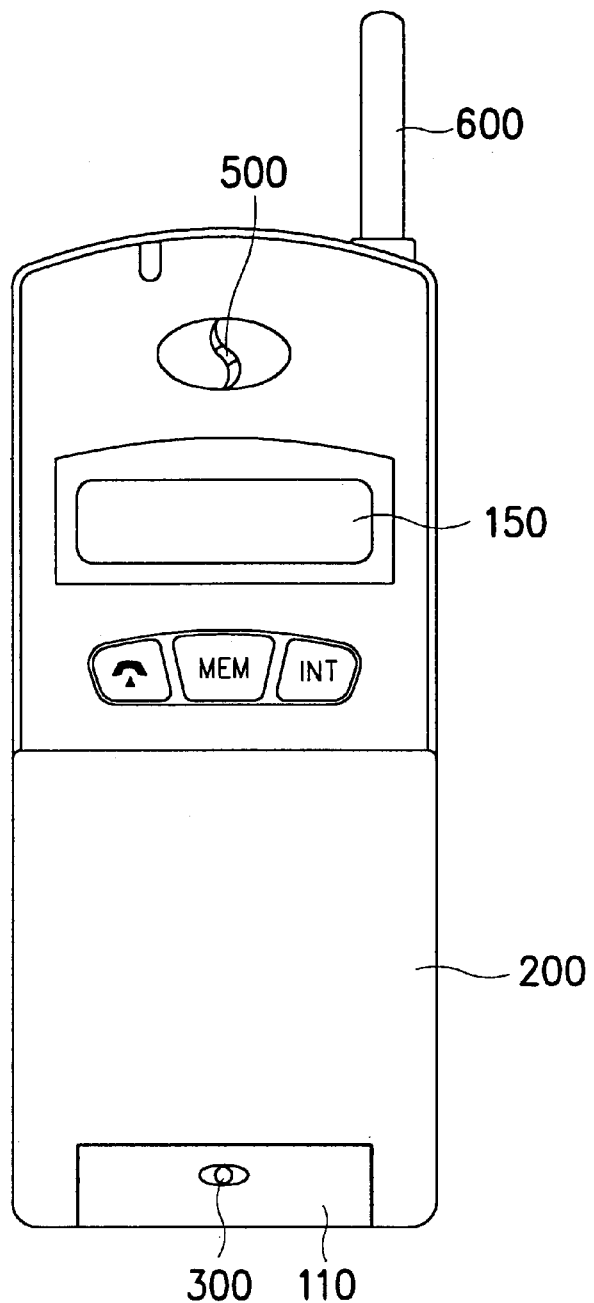
FIG. 1 is a frontal view of a conventional flip-type portable terminal.
Figure 2:
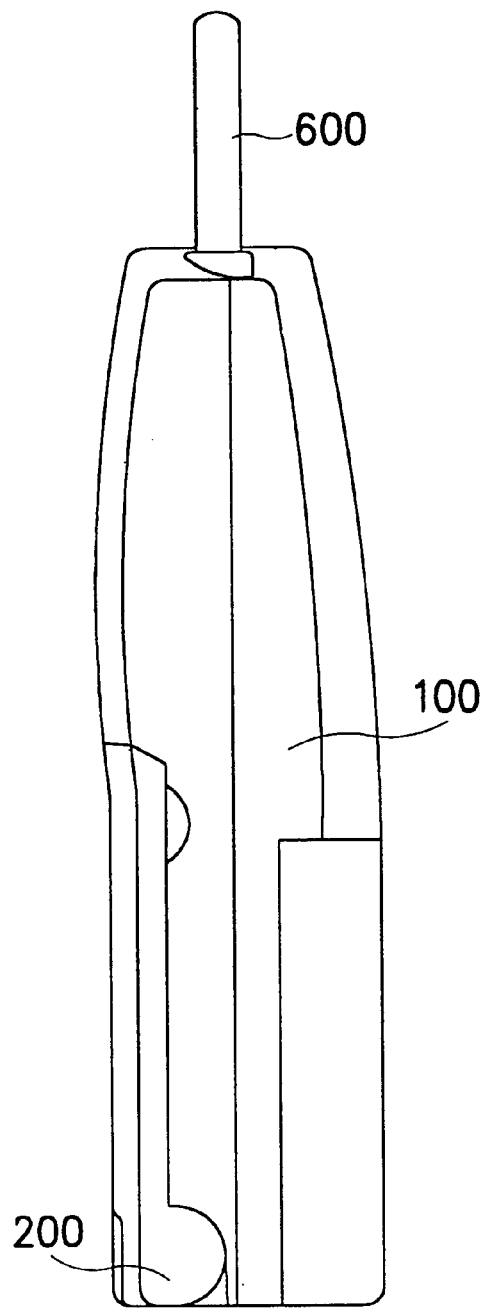
FIG. 2 is a side view of the conventional flip-type portable terminal of FIG. 1.
Figure 3:
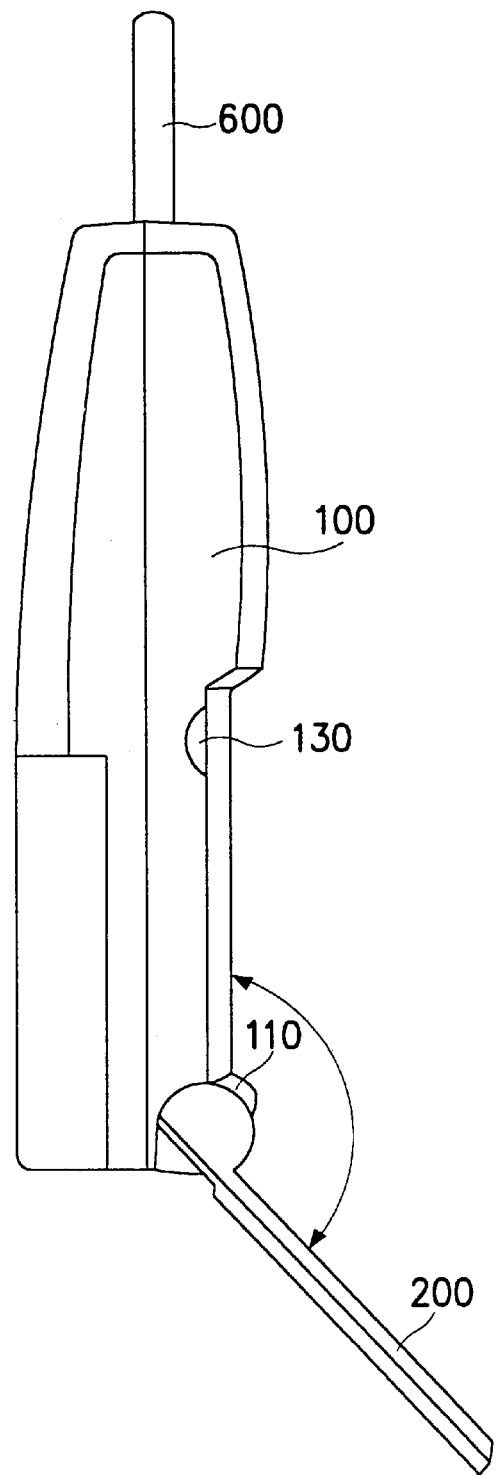
FIG. 3 is a side view of the conventional flip-type portable terminal of FIG. 1 having a flip cover opened at a speech enabling angle.

Preferred embodiments of the present invention will be described in detail referring to the attached drawings. Like reference numerals denote the same components in the drawings, and a detailed description of a related known operation or structure of the present invention will be omitted when it is deemed to obscure the subject matter of the present invention.

Figure 4:
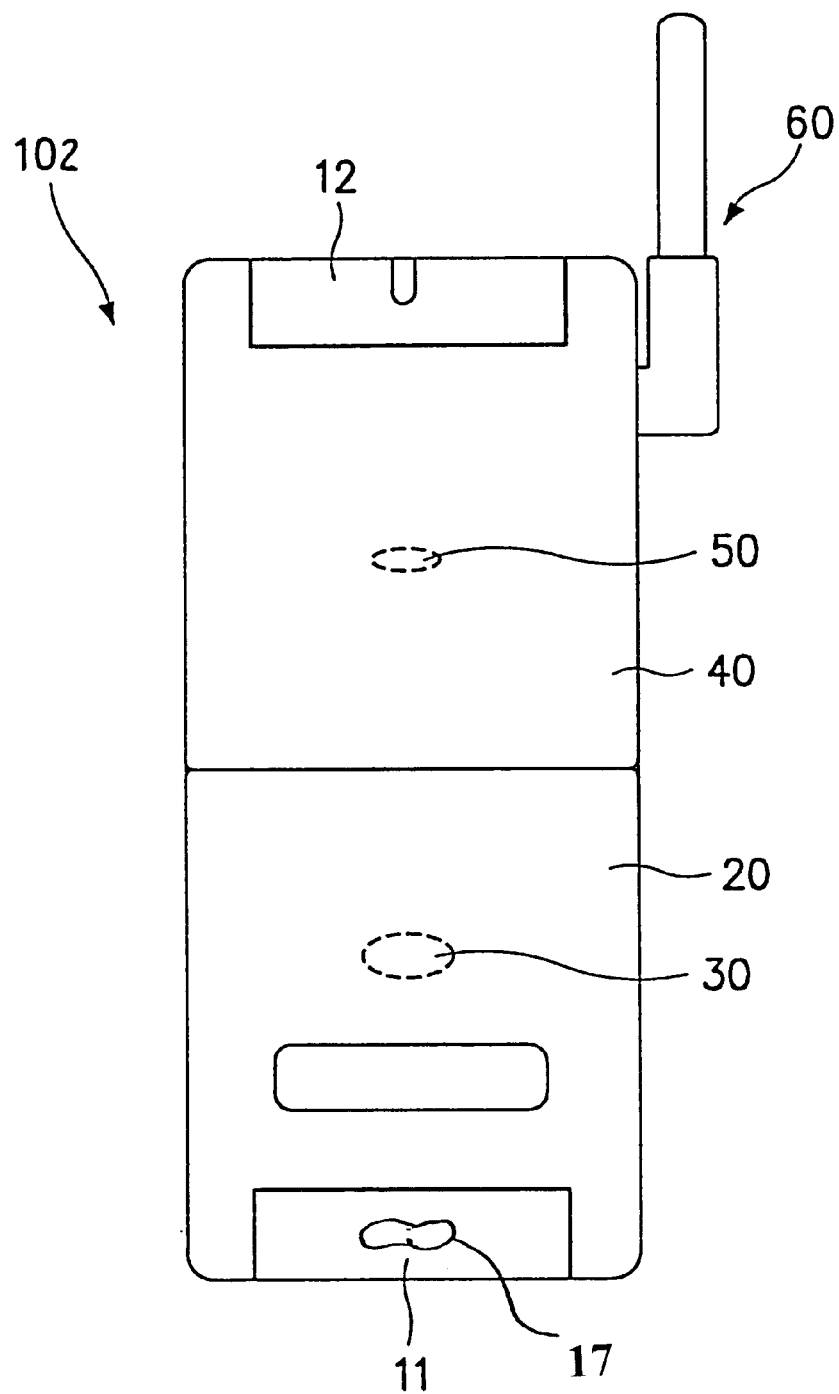
FIG. 4 is a frontal view of a flip-type portable terminal according to a preferred embodiment of the present invention.
Figure 5:
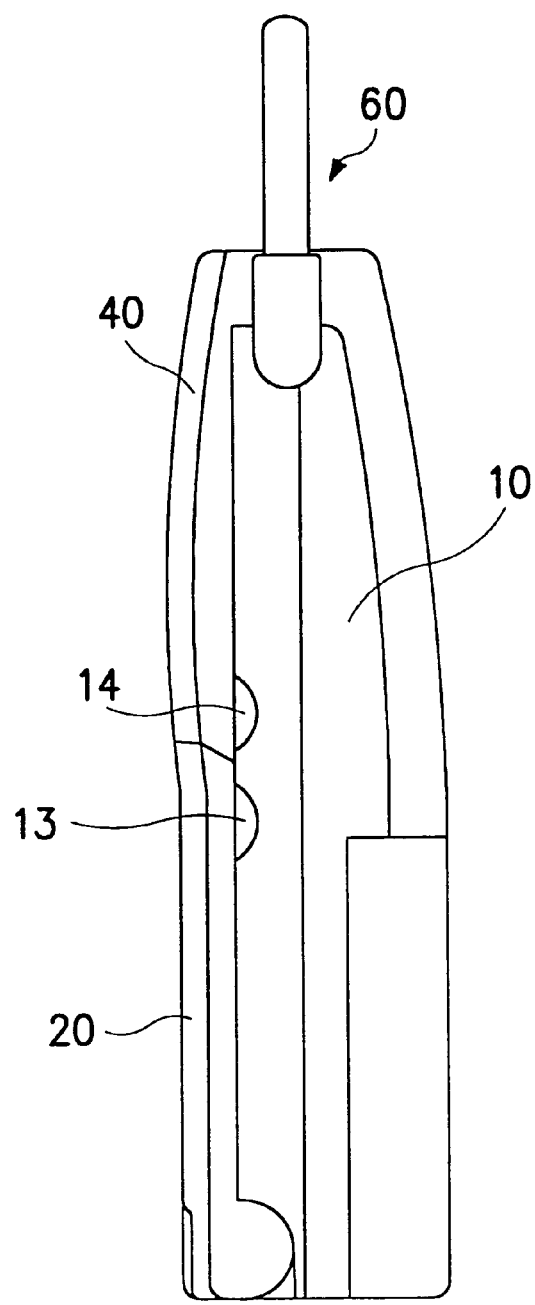
FIG. 5 is a side view of the flip-type portable terminal according to a preferred embodiment of the present invention.

FIGS. 4 and 5 are frontal and side views of a flip-type portable terminal according to a preferred embodiment of the present invention, respectively.

Referring to FIGS. 4 and 5, a flip-type portable terminal 102 of the present invention includes a body 10, flip covers 40 and 20 positioned respectively in upper and lower portions of the body 10, flip cover folding devices (not shown), a microphone 30 provided in the lower flip cover 20, and a speaker 50 in the upper flip cover 40 and a second microphone 17 positioned in the lower portion of body 10.

The key feature of the portable terminal 102 lies in the two flip covers 40 and 20 disposed in opposite portions, that is, in the upper and lower portions of the body 10, and the microphone 30 and the speaker 50 positioned in their respective flip covers 20 and 40. That is, another flip cover is provided in the upper portion of the terminal in addition to the conventional lower flip cover connected to a flip cover folding device contained in a lower portion of the terminal.

Two folding grooves 13 and 14 are defined in body 10, corresponding to the flip covers 20 and 40. Besides a flip cover folding device in a lower case 11, another flip cover folding device is provided in an upper case 12. The flip covers 20 and 40 are assembled to the lower and upper cases 11 and 12, respectively.

An antenna 60 extends upward from a side surface of the body 10 and is configured not to impede folding and unfolding operations of the upper flip cover 40.

Figure 6:
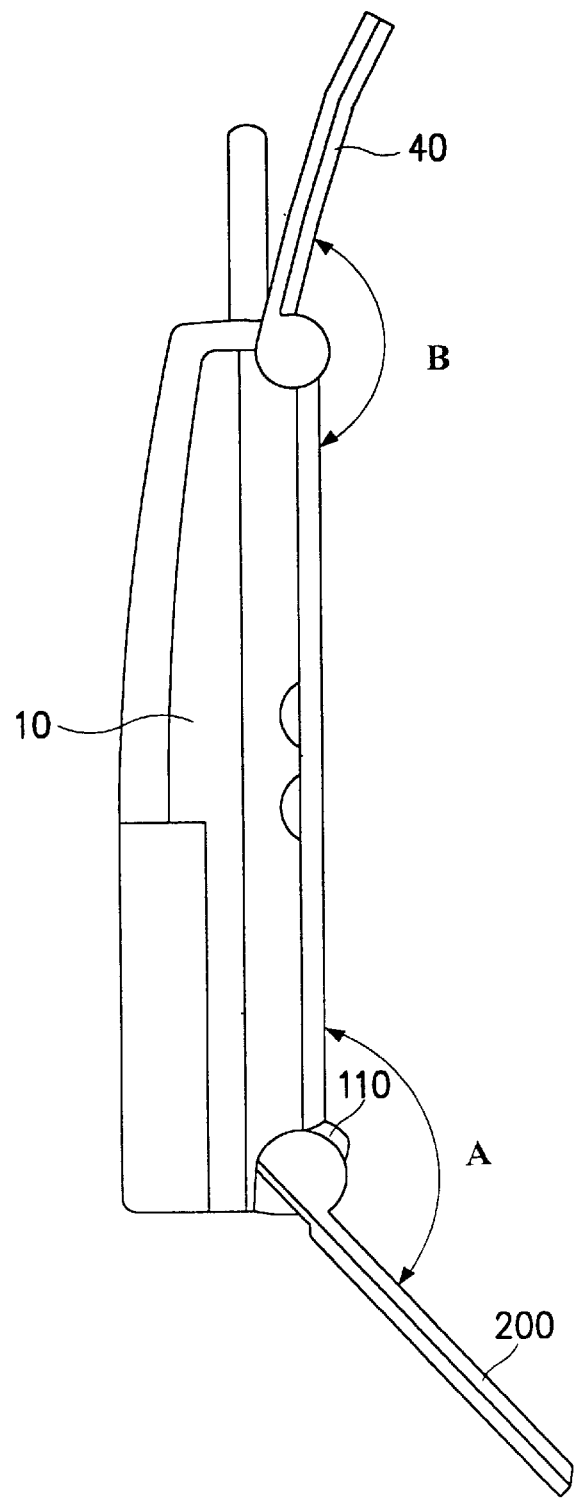
FIG. 6 is a side view of the flip-type portable terminal having dual opposing flip covers opened according to a preferred embodiment of the present invention.
Figure 7:
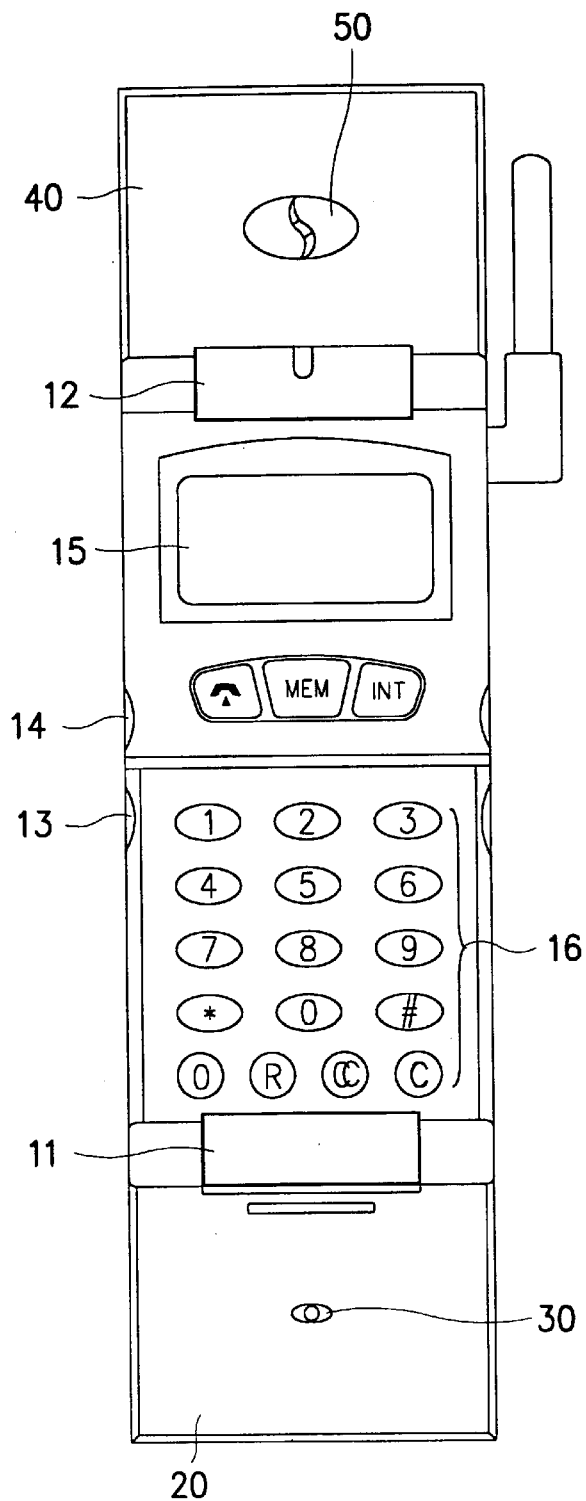
FIG. 7 is a frontal view of the flip-type portable terminal having dual opposing flip covers opened according to a preferred embodiment of the present invention.

Referring now to FIGS. 6 and 7, the structure and operation of the portable terminal having dual opposing flip covers in accordance with an embodiment of the present invention will be described in detail.

The microphone 30 is installed in the flip cover 20 combined with the flip cover folding device in the lower case 11 of the body 10. This microphone 30 is connected to an audio circuit housed within the body 10 via the flip cover 20 and the lower flip cover folding device, in mechanical contact.

In addition, the speaker 50 is installed in the other flip cover 40 combined with the other flip cover folding device in the upper case 12 of the body 10. This speaker 50 is connected to an electrical circuit housed within the body 10 via the flip cover 40 and the upper flip cover folding device, in mechanical contact.

When the flip covers 20 and 40 are unfolded, as illustrated in FIGS. 6 and 7, the microphone 30 is apart from the speaker 50 by about 14 cm, which is sufficient for a user to talk with the other party. While in a closed position, the flip cover 20 serves to prevent the malfunction of a plurality of function buttons 16 by protecting them from surroundings. While in a closed position, the other flip cover 40 protects an LCD window 15 and other function buttons from surroundings. Here, the LCD window 15 is wider and longer than a conventional one as a result of movement of the speaker 50 from the conventional upper portion of the body to the flip cover 40. This movement makes room for enlarging the LCD window 15, thus ensuring reliable reception of various character services.

Additionally, when a user wants to make an urgent call, opening the flip cover 40 allows a call to be initiated to the other party via microphone 17 positioned in the lower portion of body 10, even though the flip cover 20 is in a closed condition.

Referring now to FIG. 6, the lower flip cover 20 is positioned at a speech holding angle or at a speech enabling angle by the lower flip cover folding device. Such a speech enabling angle is about 130°, as indicated by arrow A. The mechanism of setting and maintaining the speech enabling angle by the lower flip cover device can be easily understood by anyone skilled in the art.

On the other hand, the upper flip cover 40 is at a speech enabling angle of about 180° indicated by arrow B by installing the upper flip cover folding device in a different manner from that of the lower flip cover folding device. This is more favorable to the ear of the user in that the voice of the other party is clearly heard.

As described above, the present invention can advantageously overcome the miniaturization-induced limitations of a 100 mm-or-smaller portable terminal, protect an LCD window in a body, and enlarge the LCD window, compared to the conventional portable terminal. Further, the portable terminal of the present invention provides high-quality design and appearance.

It should be noted that while the present invention has been described with reference to specific embodiments, it is clearly understood that many variations can be made by those having ordinary skill in the art within the scope and spirit of the present invention.

What is claimed is:

1. A portable terminal comprising:
    a body having a plurality of function keys, and an LCD window;
    a first flip cover folding device in a lower portion of the body;
    a first flip cover connected to the first flip cover folding device;
    a first microphone positioned in the first flip cover to be connected to the body;
    a second microphone positioned in a lower portion of the body;
    a second flip cover folding device in an upper portion of the body;
    a second flip cover connected to the second flip cover folding device; and
    a speaker positioned in the second flip cover to be connected to the body.

2. The portable terminal as claimed in claim 1, wherein the speaker is positioned on the second flip cover and enables the LCD window in the body to have an enhanced width and length.

3. The portable terminal as claimed in claim 1, wherein a dimension between the microphone and the speaker is about 14 cm when the first and second flip covers are in open positions.

4. A portable terminal comprising:
    a body;
    a first flip cover having a first end and a second end, the first end of the first flip cover being rotatably connected to a lower portion of the body;
    a first microphone mounted in the first flip cover, the microphone being electrically connected to electronics housed within the body for transmitting an audio signal;
    a second microphone positioned in a lower portion of the body;
    a second flip cover having a first end and a second end, the first end of the second flip cover being rotatably connected to an upper portion of the body; and
    a speaker mounted in the second flip cover, the speaker being electrically connected to electronics housed within the body for receiving an audio signal.

5. The portable terminal as recited in claim 4, further comprising an antenna connected to a side portion of the body.

6. The portable terminal as recited in claim 4, further comprising a plurality of function keys mounted on the body and electrically connected to electronics housed within the body.

7. The portable terminal as recited in claim 4, further comprising a liquid crystal display mounted on the body and electrically connected to electronics housed within the body.

8. The portable terminal as recited in claim 4, wherein a dimension between the first microphone and the speaker is about 14 cm when the first and second flip covers are in open positions.